US011853823B2

(12) United States Patent
Ohyama

(10) Patent No.: US 11,853,823 B2
(45) Date of Patent: Dec. 26, 2023

(54) IMAGE FORMING SYSTEM, METHOD OF PRINTING IDENTIFICATION INFORMATION, AND STORAGE MEDIUM

(71) Applicant: Tatsuo Ohyama, Kanagawa (JP)

(72) Inventor: Tatsuo Ohyama, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 17/897,678

(22) Filed: Aug. 29, 2022

(65) Prior Publication Data

US 2023/0094188 A1  Mar. 30, 2023

(30) Foreign Application Priority Data

Sep. 30, 2021  (JP) .................................. 2021-162203

(51) Int. Cl.
| | |
|---|---|
| *G06K 15/02* | (2006.01) |
| *B41J 2/045* | (2006.01) |
| *G03G 15/00* | (2006.01) |
| *G06K 15/00* | (2006.01) |

(52) U.S. Cl.
CPC ...... *G06K 15/1889* (2013.01); *B41J 2/04536* (2013.01); *B41J 2/04586* (2013.01); *G03G 15/50* (2013.01); *G06K 15/186* (2013.01); *G06K 15/1822* (2013.01); *G06K 15/403* (2013.01); *G06K 15/4065* (2013.01)

(58) Field of Classification Search
None
See application file for complete search history.

(56) References Cited

U.S. PATENT DOCUMENTS

| | | |
|---|---|---|
| 2008/0309951 A1 | 12/2008 | Kishi et al. |
| 2009/0226217 A1 | 9/2009 | Tsukamoto |
| 2010/0239288 A1 | 9/2010 | Ohyama |
| 2011/0063680 A1 | 3/2011 | Ohyama |
| 2011/0298883 A1 | 12/2011 | Ohyama |
| 2013/0127975 A1 | 5/2013 | Ohyama |
| 2015/0222290 A1 | 8/2015 | Miyadera et al. |
| 2015/0261116 A1 | 9/2015 | Murota et al. |
| 2015/0261117 A1 | 9/2015 | Suzuki et al. |
| 2016/0126977 A1 | 5/2016 | Miyadera et al. |
| 2020/0213476 A1 | 7/2020 | Tsuji |

FOREIGN PATENT DOCUMENTS

| | | |
|---|---|---|
| JP | 2005-318478 A | 11/2005 |
| JP | 2017-032572 | 2/2017 |

OTHER PUBLICATIONS

Extended European Search Report dated Feb. 22, 2023 issued in corresponding European Appln. No. 22193473.0.

*Primary Examiner* — Lennin R Rodriguezgonzalez

(74) *Attorney, Agent, or Firm* — Harness, Dickey & Pierce, P.L.C.

(57) ABSTRACT

An image forming system includes processing circuitry. The processing circuitry generates print image data for printing a first image in a print area on a conveyance medium. The processing circuitry controls printing on the conveyance medium based on the print image data. The processing circuitry determines a position at which a second image is printed in a cut area, based on a position of a cutting mark, to generate the print image data including the second image, the second image including identification information to identify each page of the conveyance medium, the cut area being an area to be cut in the print area.

20 Claims, 12 Drawing Sheets

IMAGE FORMING SYSTEM, METHOD OF PRINTING IDENTIFICATION INFORMATION, AND STORAGE MEDIUM

CROSS-REFERENCE TO RELATED APPLICATION

This patent application is based on and claims priority pursuant to 35 U.S.C. § 119(a) to Japanese Patent Application No. 2021-162203, filed on Sep. 30, 2021, in the Japan Patent Office, the entire disclosure of which is hereby incorporated by reference herein.

BACKGROUND

Technical Field

Embodiments of the present disclosure relate to an image forming system, a method of printing identification information, and a storage medium.

Related Art

Various technologies have been developed that detect a defect in an image printed by an image forming apparatus, based on the result of reading the image. For example, techniques are known that assign identification information to each page of printed materials and add the identification information to the image of each page so as to facilitate identifying the position of a defective page.

A technique is known that prints identification information such as characters in an area that is not used in a printed material.

SUMMARY

Embodiments of the present disclosure described herein provide a novel image forming system including processing circuitry. The processing circuitry generates print image data for printing a first image in a print area on a conveyance medium. The processing circuitry controls printing on the conveyance medium based on the print image data. The processing circuitry determines a position at which a second image is printed in a cut area, based on a position of a cutting mark, to generate the print image data including the second image, the second image including identification information to identify each page of the conveyance medium, the cut area being an area to be cut in the print area.

Embodiments of the present disclosure described herein provide a novel computer-executable method of printing identification information. The method includes generating, controlling, and determining. The generating generates print image data for printing a first image in a print area on the conveyance medium. The controlling controls printing on the conveyance medium based on the print image data. The determining determines a position at which a second image is printed in a cut area, based on a position of a cutting mark, to generate the print image data including the second image, the second image including identification information to identify each page of the conveyance medium, the cut area being an area to be cut in the print area.

Embodiments of the present disclosure described herein provide a novel non-transitory, computer-readable storage medium storing computer-readable program code that causes a computer to perform generating, controlling, and determining. The generating generates print image data for printing a first image in a print area on the conveyance medium. The controlling controls printing on the conveyance medium based on the print image data. The determining determines a position at which a second image is printed in a cut area, based on a position of a cutting mark, to generate the print image data including the second image, the second image including identification information to identify each page of the conveyance medium, the cut area being an area to be cut in the print area.

BRIEF DESCRIPTION OF THE DRAWINGS

A more complete appreciation of the disclosure and many of the attendant advantages and features thereof can be readily obtained and understood from the following detailed description with reference to the accompanying drawings, wherein.

Figure 1:
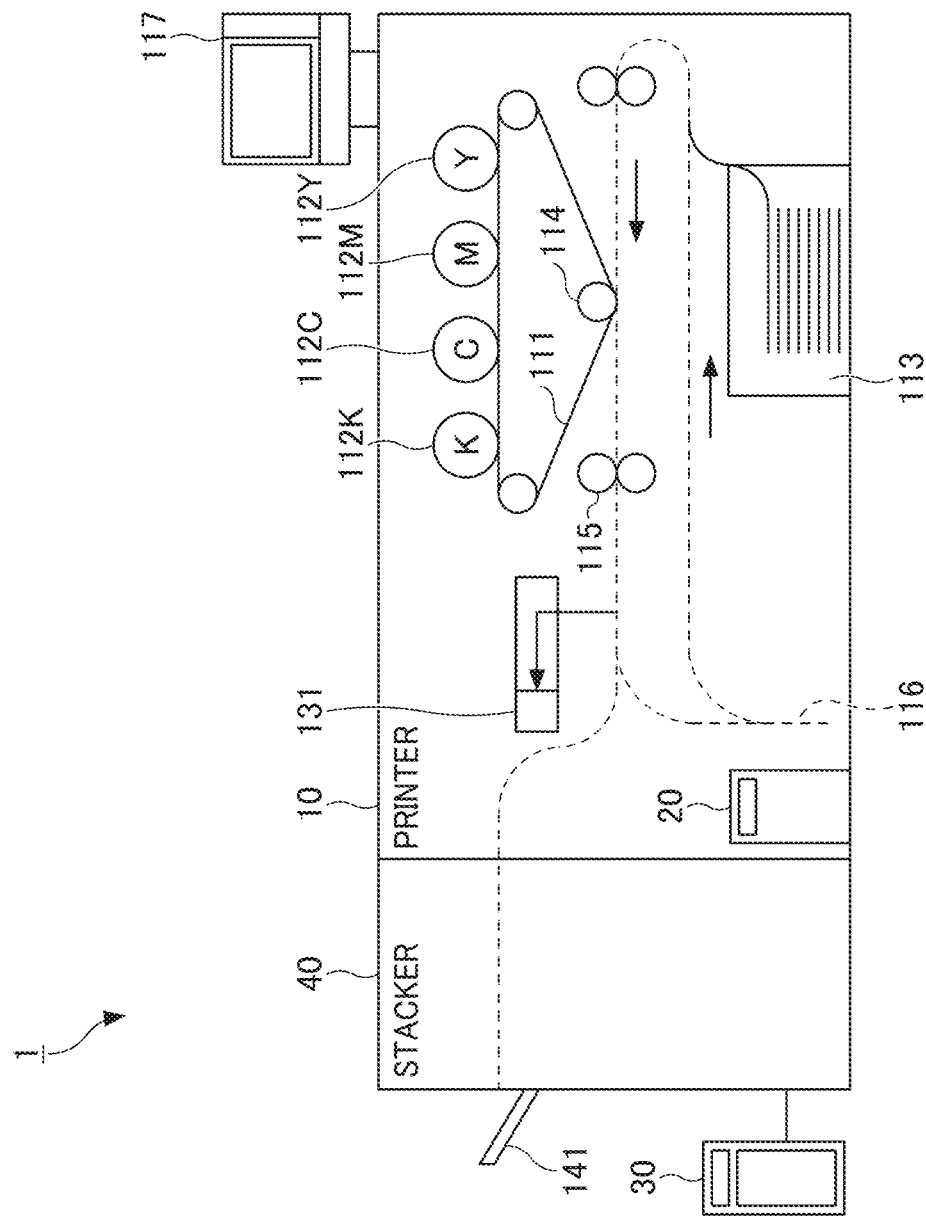
FIG. 1 is a diagram illustrating a system configuration of an image forming system according to embodiments of the present disclosure.

The accompanying drawings are intended to depict embodiments of the present invention and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

Descriptions are given of an image forming system according to embodiments of the present disclosure, with reference to the drawings.

FIG. 1 is a diagram illustrating a system configuration of an image forming system according to embodiments of the present disclosure.

An image forming system 1 includes a printer 10, an inspection device 20, a digital front end (DFE) 30, and a stacker 40. These devices are communicatively connected to each other via a communication line or a communication network.

The printer 10 receives print job data including a user image from an external device such as the DFE 30. Then, the printer 10 executes printing in response to receipt of an execution instruction based on the received print job data or a user operation on an operation panel 117 of the printer 10.

The printer 10 includes photoconductor drums 112Y, 112M, 112C, and 112K disposed along a conveyance belt 111. The photoconductor drums 112Y, 112M, 112C, and 112K form yellow (Y), magenta (M), cyan (C), and black (K) toner images, respectively. The conveyance belt 111 is a moving unit of an endless loop.

Specifically, the printer 10 includes the photoconductor drums 112Y, 112M, 112C, and 112K disposed in this order from upstream in a traveling direction of the conveyance belt 111. The conveyance belt 111 is an intermediate transfer belt on which an intermediate transfer image to be transferred onto a sheet fed from a sheet feeding tray 113 along the conveyance belt 111 is formed.

The printer 10 transfers respective images of black (K), cyan (C), magenta (M), and yellow (Y), which are developed with toner on respective surfaces of the photoconductor drums 112 for the four colors, onto the conveyance belt 111 in a superimposing manner to form a full color image. Then, the printer 10 transfers the full color image formed on the conveyance belt 111 onto the sheet that has been conveyed by a transfer roller 114 along a sheet conveyance passage, at a position at which the full color image comes closest to the sheet conveyance passage indicated with broken lines in FIG. 1. Accordingly, the full color image is formed on the sheet.

The printer 10 further conveys the sheet having the image on the surface, so that the image is fixed to the sheet by a fixing roller pair 115. Then, the sheet is conveyed to a reading device 131 disposed downstream from the fixing roller pair 115 in a conveyance 5 direction of the sheet. The reading device 131 reads the sheet conveyed via the fixing roller pair 115 and generates read image data. Note that the reading device 131 may read the full color image after the full color image is fixed to the sheet by the fixing roller pair 115. Alternatively, the reading device 131 may read the full color image before the sheet enters the fixing roller pair 115 after the full color image is transferred by the transfer roller 114.

In the case of single-side printing, the printer 10 directly ejects the sheet read by the reading device 131 to the stacker 40. In the case of duplex printing, the printer 10 reverses the sheet read by the reading device 131, in a sheet reverse passage 116, and then conveys the sheet to a transfer position of the transfer roller 114 again.

Subsequently, the printer 10 transfers and fixes a toner image to the opposite side of the sheet having the printed image on one side. Then, the reading device 131 reads the printed surface. Subsequently, the printer 10 ejects the duplex printed sheet to the stacker 40.

The stacker 40 stacks and stores sheets ejected from the printer 10 on a sheet ejection tray 141.

The inspection device 20 is a device that inspects printed sheets output from the printer 10. Specifically, the inspection device 20 generates a master image based on rasterized image data received from the printer 10. Then, the inspection device 20 compares the read image read by the reading device 131 with the master image and determines whether the read image includes any defect. The operation panel 117 acquires information indicating an inspection result from the inspection device 20 and displays the information. The rasterized image is, for example, in the CMYK format (format in a subtractive color mode including cyan, magenta, yellow, and black) with 8-bit colors and 600 dpi resolution. The read image is, for example, in the red, green, and blue (RGB) format with 8-bit colors and 200 dpi resolution.

The DFE 30 receives and manages print job data from a terminal operated by a user. The print job data includes image data and print job information indicating attributes of the job such as the number of copies to be printed, the number of pages to be printed, duplex or single-side printing, and the type of sheet. The DFE 30 adds the received print job data as a queue to a memory that stores the print job data. The DFE 30 extracts the print job data from the queue in the order in which the print job data is added to the queue or in accordance with a priority set appropriately. Then, the DFE 30 transmits the print job data to the printer 10.

Figure 2:
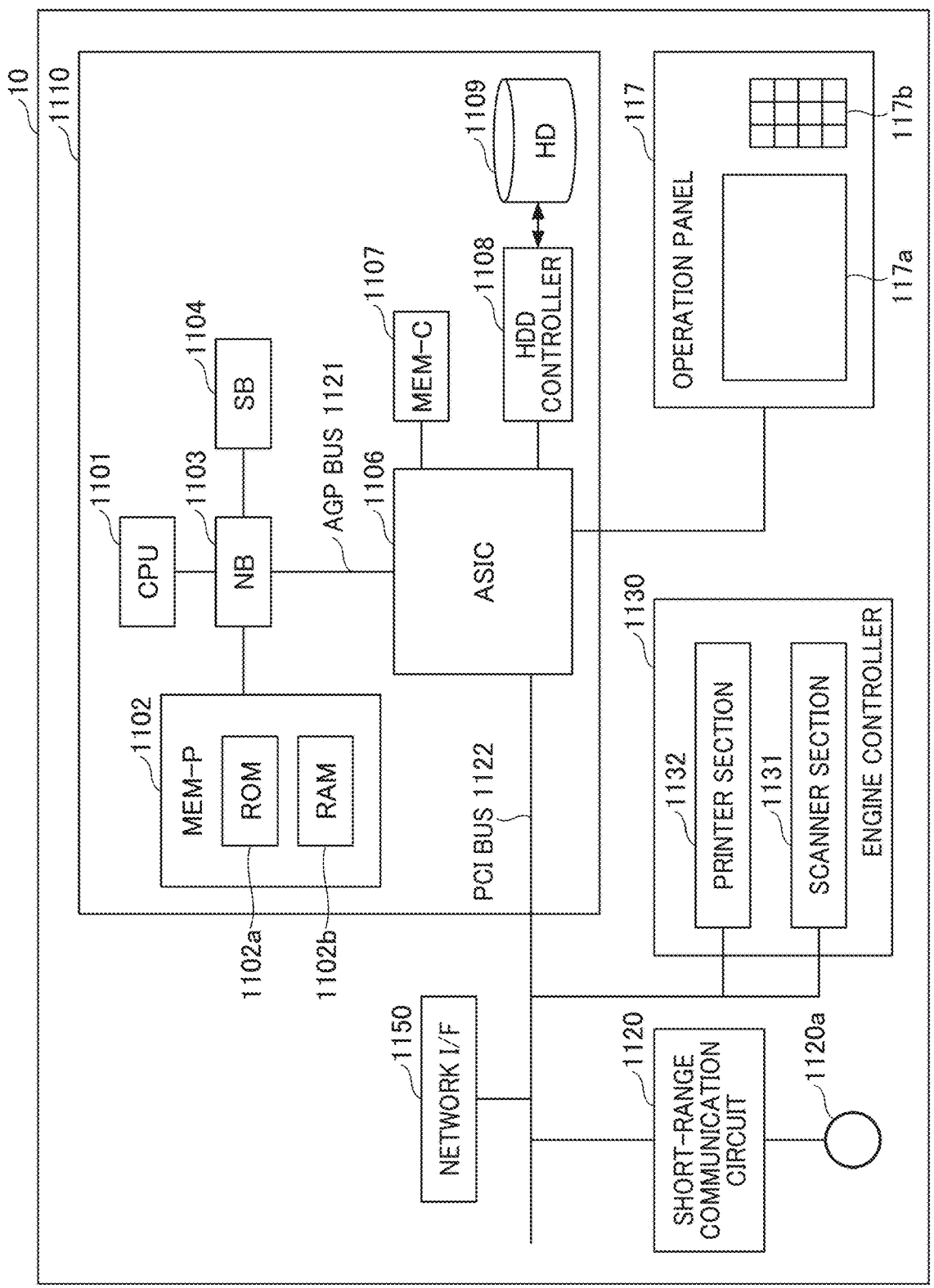
FIG. 2 is a diagram illustrating a hardware configuration of a printer of the image forming system of FIG. 1.

FIG. 2 is a diagram illustrating a hardware configuration of the printer 10.

The printer 10 includes a controller 1110, a short-range communication circuit 1120, 5 an engine controller 1130, the operation panel 117, and a network interface (I/F) 1150.

The controller 1110 includes a central processing unit (CPU) 1101 that is a main part of a computer, a system memory (MEM-P) 1102, a north bridge (NB) 1103, a south bridge (SB) 1104, an application specific integrated circuit (ASIC) 1106, a local memory (MEM-C) 1107 that is a memory device, a hard disk drive (HDD) controller 1108, and a hard disk (HD) 1109 that is a memory device.

The NB 1103 and the ASIC 1106 are connected with an accelerated graphics port (AGP) bus 1121.

The CPU 1101 is a control device that performs overall control of the printer 10. The NB 1103 is a bridge to connect the CPU 1101, the MEM-P 1102, the SB 1104, and the AGP bus 1121. The NB 1103 includes a memory controller that controls reading from and writing to the MEM-P 1102, a peripheral component interconnect (PCI) master, and an AGP target.

The MEM-P 1102 includes a read only memory (ROM) 1102a and a random access memory (RAM) 1102b. The ROM 1102a is a memory to store programs and data for implementing various functions of the controller 1110. The RAM 1102b is a memory to deploy programs, data or to render print data for memory printing. The program stored in the RAM 1102b may be provided as a file in an installable format or an executable format that the program is recorded in a computer-readable storage medium such as a compact disc-read only memory (CD-ROM), a compact disc-recordable (CD-R), or a digital versatile disc (DVD).

The SB 1104 is a bridge to connect the NB 1103 to PCI devices and peripheral devices. The ASIC 1106 is an integrated circuit (IC) for image processing having a hardware element for image processing and has a role of a bridge that connects the AGP bus 1121, a PCI bus 1122, the HDD controller 1108, and the MEM-C 1107 to each other.

The ASIC 1106 includes a PCI target, an AGP master, an arbiter (ARB) serving as a core of the ASIC 1106, a memory controller that controls the MEM-C 1107, a plurality of direct memory access controllers (DMAC) that rotates image data by hardware logic, and a PCI unit that transfers data between a scanner section 1131 and a printer section 1132 via the PCI bus 1122. Note that a universal serial bus (USB) interface or an Institute of Electrical and Electronics Engineers 1394 (IEEE 1394) interface may be connected to the ASIC 1106.

The MEM-C 1107 is a local memory used as a copy image buffer and a code buffer. The HD 1109 is a memory device that stores image data, font data used in printing, and forms. The HD 1109 controls reading or writing of data from or to the HD 1109 under the control of the CPU 1101.

The AGP bus 1121 is a bus interface for a graphics accelerator card that has been proposed to speed up graphics processing. The AGP bus 1121 is a bus that allows direct access to the MEM-P 1102 at high throughput to speed up the graphics accelerator card.

The short-range communication circuit 1120 includes a short-range communication antenna 1120*a*. The short-range communication circuit 1120 is a communication circuit that communicates in compliance with the near field radio communication (NFC) or the Bluetooth®.

The engine controller 1130 includes the scanner section 1131 and the printer section 1132. The operation panel 117 includes a panel display 117*a* and hard keys 117*b*. The panel display 117*a* is, e.g., a touch screen that displays current settings or a selection screen that receives a user input. The hard keys 117*b* include, e.g., a numeric keypad and a start key. The numeric keypad receives setting values of image forming parameters such as an image density parameter. The start key receives an instruction to start copying.

The controller 1110 controls the overall printer 10 and controls, for example, drawing, communication, and input from the operation panel 117. The scanner section 1131 reads an image formed on a conveyance medium such as a sheet and generates image data. The printer section 1132 includes a transfer device to transfer the image using a color material such as a toner image onto the conveyance medium such as the sheet, a fixing device to fix the image, a heating device, a drying device, and performs image formation on the sheet. Further, the scanner section 1131 or the printer section 1132 executes image processing such as error diffusion and gamma conversion.

Note that the sheet is an example of the conveyance medium. The conveyance medium may be any medium other than paper, such as a film sheet or a plastic sheet, as long as the conveyance medium is stacked in a sheet feeding tray provided for the printer 10, to be conveyed and output according to an output instruction of a sheet.

The network I/F 1150 is an interface that performs communication of data through the communication network. The short-range communication circuit 1120 and the network I/F 1150 are electrically connected to the ASIC 1106 via the PCI bus 1122.

Although the example of the printer 10 illustrated in FIG. 2 includes an electrophotographic image forming mechanism, the printer 10 may include another image forming mechanism such as an inkjet image forming mechanism.

Figure 3:
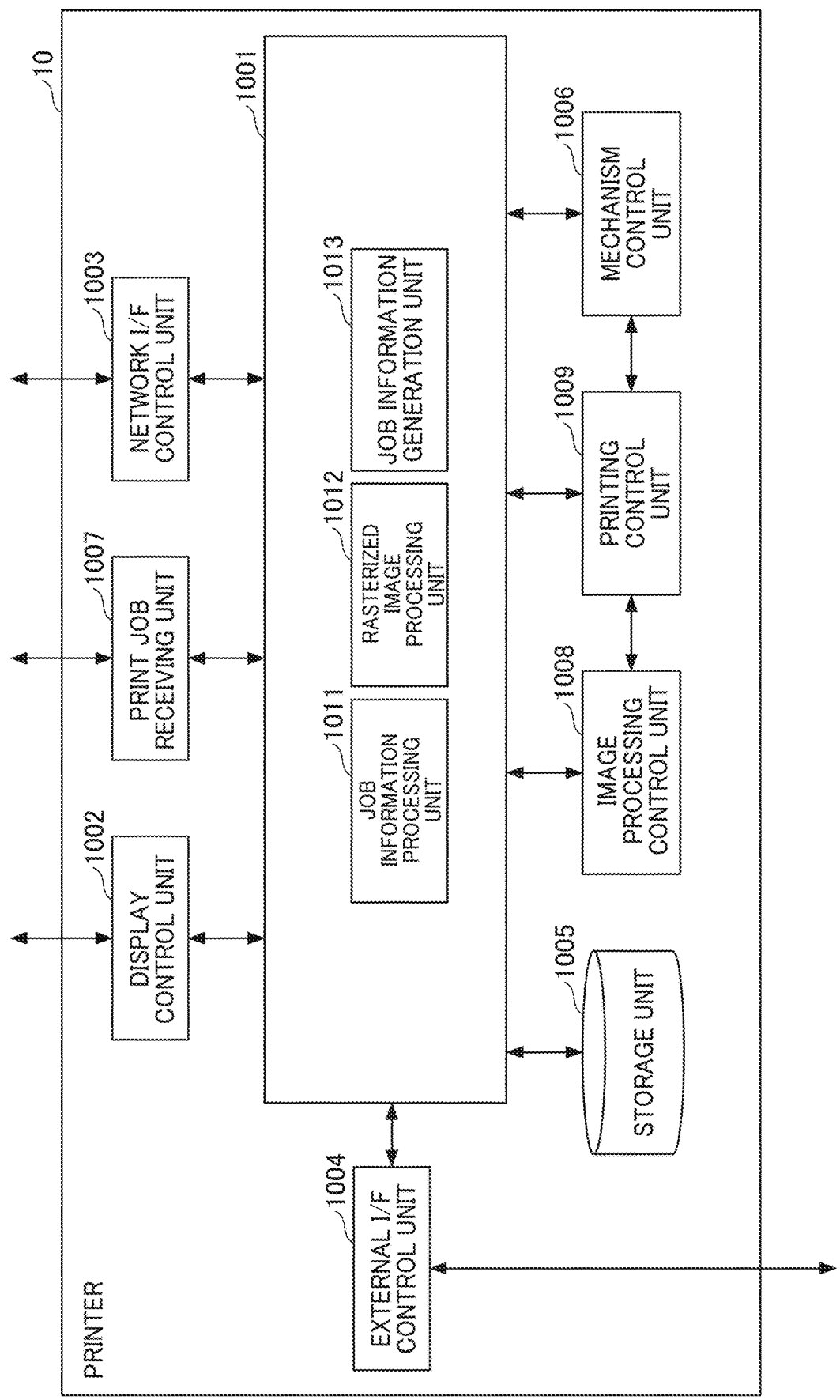
FIG. 3 is a diagram illustrating a functional configuration of the printer of the image forming system of FIG. 1.

FIG. 3 is a diagram illustrating a functional configuration of the printer 10 of the image forming system of FIG. 1.

The printer 10 includes a system control unit 1001, a display control unit 1002, a network I/F control unit 1003, an external I/F control unit 1004, a storage unit 1005, a mechanism control unit 1006, a print job receiving unit 1007, an image processing control unit 1008, and a printing control unit 1009. Each of these units of the printer 10 is achieved by the CPU 1101 or the ASIC 1106 of the printer 10 executing a process defined in programs stored in the MEM-P 1102 or the MEM-C 1107.

The system control unit 1001 controls the overall operation of the printer 10. The system control unit 1001 includes a job information processing unit 1011, a rasterized image processing unit 1012, and a job information generation unit 1013.

The job information processing unit 1011 processes job information included in the print job data transmitted from the DFE 30. The job information processing unit 1011 adds an identification number for identifying a conveyance medium such as the sheet to job information. The identification number may be, for example, a serial number that is incremented by one for each time a sheet is fed, or may be a number including a job ID, a copy number, and a page number. In addition, the identification number may be matched with the page number of each print job as long as a user recognizes which print job is associated with the identification number.

The identification number is an example of identification information for identifying a conveyance medium. The identification information may be in any form, for example, a numerical value, a character, a barcode, a two-dimensional code, or a combination of these forms. When duplex printing is performed, the identification information may include information indicating whether a page is a front face or a back face or may be a different number for each page so that whether the page is the front face or the back face is identified.

The rasterized image processing unit 1012 performs predetermined color conversion processing on the CMYK values or the RGB values of the image data included in the print job data, using a rasterized image processing engine and converts the CMYK values or the RGB values into image data in a CMYK format suitable for printing.

The rasterized image processing unit 1012 generates print image data for printing an image included in the print job data on a sheet. The image included in the print image data is referred to as a user image or as a first image. In addition, the rasterized image processing unit 1012 acquires a setting value for adding an identification number image. The identification number image is an image indicating the identification number and may also be referred to as a second image. In a case where the print job assumes the cutting of the sheet and the setting value indicates adding identification number image, the rasterized image processing unit 1012 performs processing of adding the identification number.

In other words, the rasterized image processing unit 1012 acquires the identification number from the job information processing unit 1011, generates the identification number image, and generates print image data including the generated identification number image and the user image.

To be more specific, in a case where the print job assumes the cutting of the sheet, the rasterized image processing unit 1012 generates the print image data including the identification number image and the user image. The identification number image is included in an area to be cut in a sheet (referred to as a cut area or a first area). The user image is included in an area other than the cut area (referred to as a non-cut area or a second area). The specific process of the rasterized image processing unit 1012 is described below.

Note that the rasterized image processing unit 1012 is an example of a print image generation unit that generates a print image.

In a case where a print image is transferred onto a conveyance medium such as a sheet at a position close to the leading end of the conveyance medium in a conveyance direction of the conveyance medium in an electrophotographic printing process, the separation error of the conveyance medium is more likely to occur when the sheet is separated from a fixing device that fixes a color material onto the conveyance medium after the transfer of the print image on the conveyance medium. For this reason, a known technique provides a margin area having an appropriate size at the leading end of a sheet. The margin area is an area set in advance for each type of sheet as an area where printing is not performed.

The job information generation unit 1013 generates special job information based on information received from the inspection device 20. For example, in a case where a defect occurs in an image, the job information generation unit 1013 may receive information to be printed on a slip sheet from the inspection device 20 and generate job information for printing the slip sheet.

The display control unit 1002 controls to display various types of information including job information on the operation panel 117. The network I/F control unit 1003 controls the network I/F 1150 and controls connection with the communication network. When another device is connected to the printer 10, the external I/F control unit 1004 controls connection with the connected device. The storage unit 1005 stores various types of information including job information.

The mechanism control unit 1006 controls operations of mechanisms included in the printer 10, such as operations of a mechanism that performs sheet conveyance and operations of a mechanism that performs a transfer process in the printer 10 including the printer section 1132. The print job receiving unit 1007 receives the print job data from the DFE 30. The image processing control unit 1008 processes a print image transferred by the mechanism control unit 1006. The printing control unit 1009 controls the image formation on the conveyance medium. The mechanism control unit 1006, the image processing control unit 1008, and the printing control unit 1009 cooperate with each other to function as a print control unit that forms an image on the conveyance medium.

Figure 4:
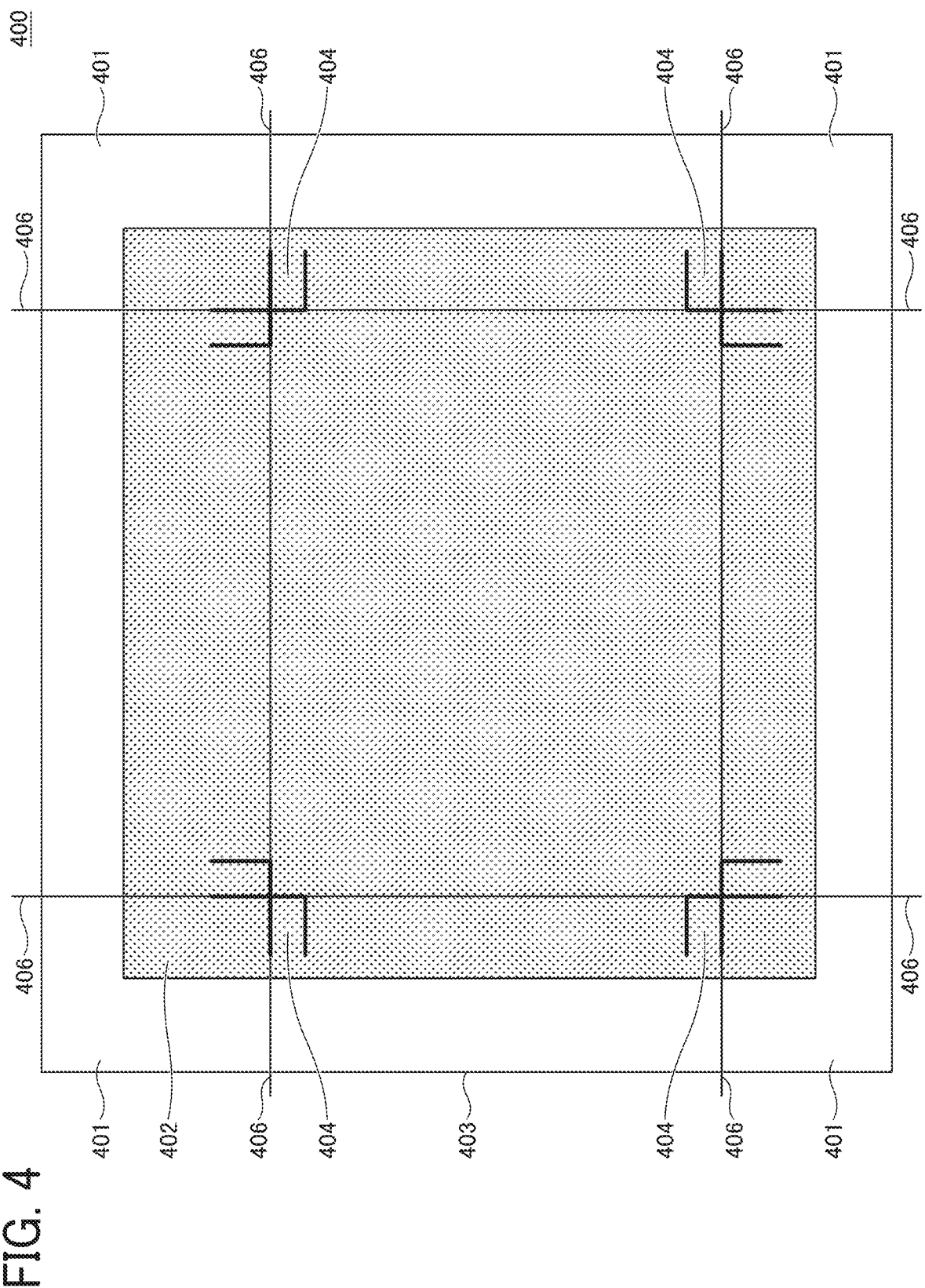
FIG. 4 is a diagram illustrating a margin area and a cut area according to embodiments of the present disclosure.

FIG. 4 is a diagram illustrating the margin area and the cut area according to embodiments of the present disclosure.

A margin area 401 along an edge 403 of a sheet 400 is set in advance for each type of sheet as an area where printing is not performed. An area of the sheet 400 excluding the margin area 401 is a user image area 402. The user image designated by the print job data is printed in the user image area 402 of the sheet 400.

The margin area 401 is an area within a certain length from an edge of the sheet 400 to the center of the sheet 400. In the following description, it is assumed that the identification number image is printed in the margin area 401 at each of an upper end, a lower end, a left end, and a right end of the sheet 400. Note that the identification number image may be printed in the margin area 401 at one, two, or three of the upper end, the lower end, the left end, and the right end of the sheet 400. The margin area 401 at the upper end of the sheet 400 is, for example, an area that fits within a certain length from the upper edge of the sheet 400.

In a case where the sheet 400 is cut, the user image may include a cutting mark 404. In a case where the user image includes the cutting mark 404, the position of a cutting line 406 is specified from the shape of the cutting mark 404. Then, the area outside the cutting line 406 is the cut area. In the user image area 402, an area that is not cut is the non-cut area. The cutting line 406 is a line indicating a boundary between the cut area and the non-cut area.

Figure 5:
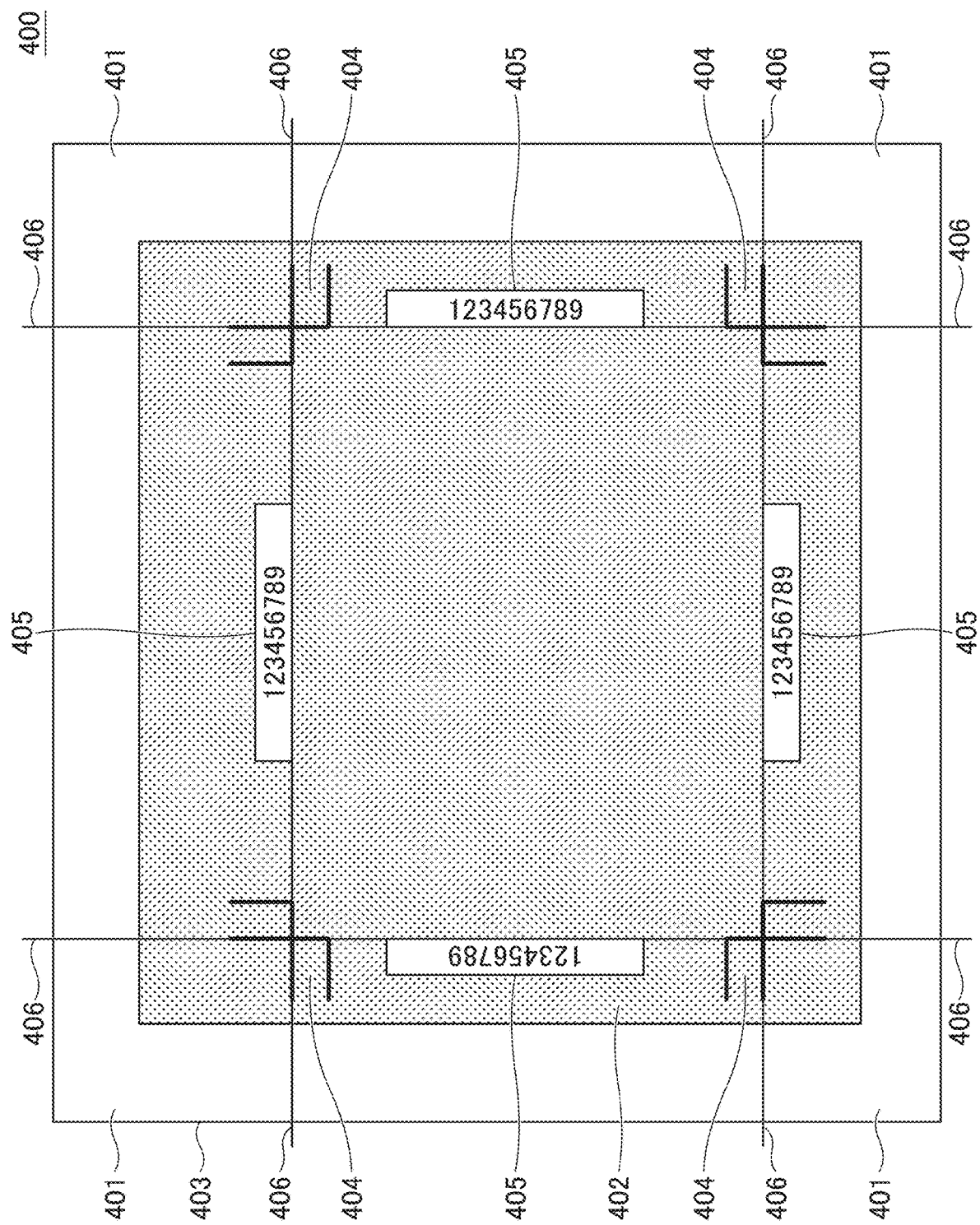
FIG. 5 is a diagram illustrating an example of a method of determining a print position of an identification number image, according to embodiments of the present disclosure.

FIG. 5 is a diagram illustrating an example of a method of determining a print position of the identification number image, according to embodiments of the present disclosure.

The rasterized image processing unit 1012 determines to set the print position of the identification number image to the cut area near the cutting mark 404. Specifically, the rasterized image processing unit 1012 sets a position closest to the non-cut area, of the cut area in the user image area 402, as the print position of the identification number image. In the example of FIG. 5, the position closest to the non-cut area is a position in contact with the cutting line 406 in the cut area. The rasterized image processing unit 1012 may set the print position of the identification number image to a position where the distance between the print position of the identification number image and the cutting line 406 is a predetermined offset value. Alternatively, the rasterized image processing unit 1012 may set the print position of the identification number image to a position where the distance is smaller than the offset value.

Note that a user may designate the print position of the identification number image. In this case, the rasterized image processing unit 1012 may determine the position designated by the user as the print position of the identification number image regardless of the presence or absence or the position of the cutting mark.

The rasterized image processing unit 1012 generates the identification number image for each page and adds the identification number image to the print image of each page. The identification number image includes an identification number portion and a blank portion. The blank portion is white color. Note that the blank portion may be clear instead of white color so that the user image is visible. The identification number image does not include a frame border of, for example, black color.

Figure 6:
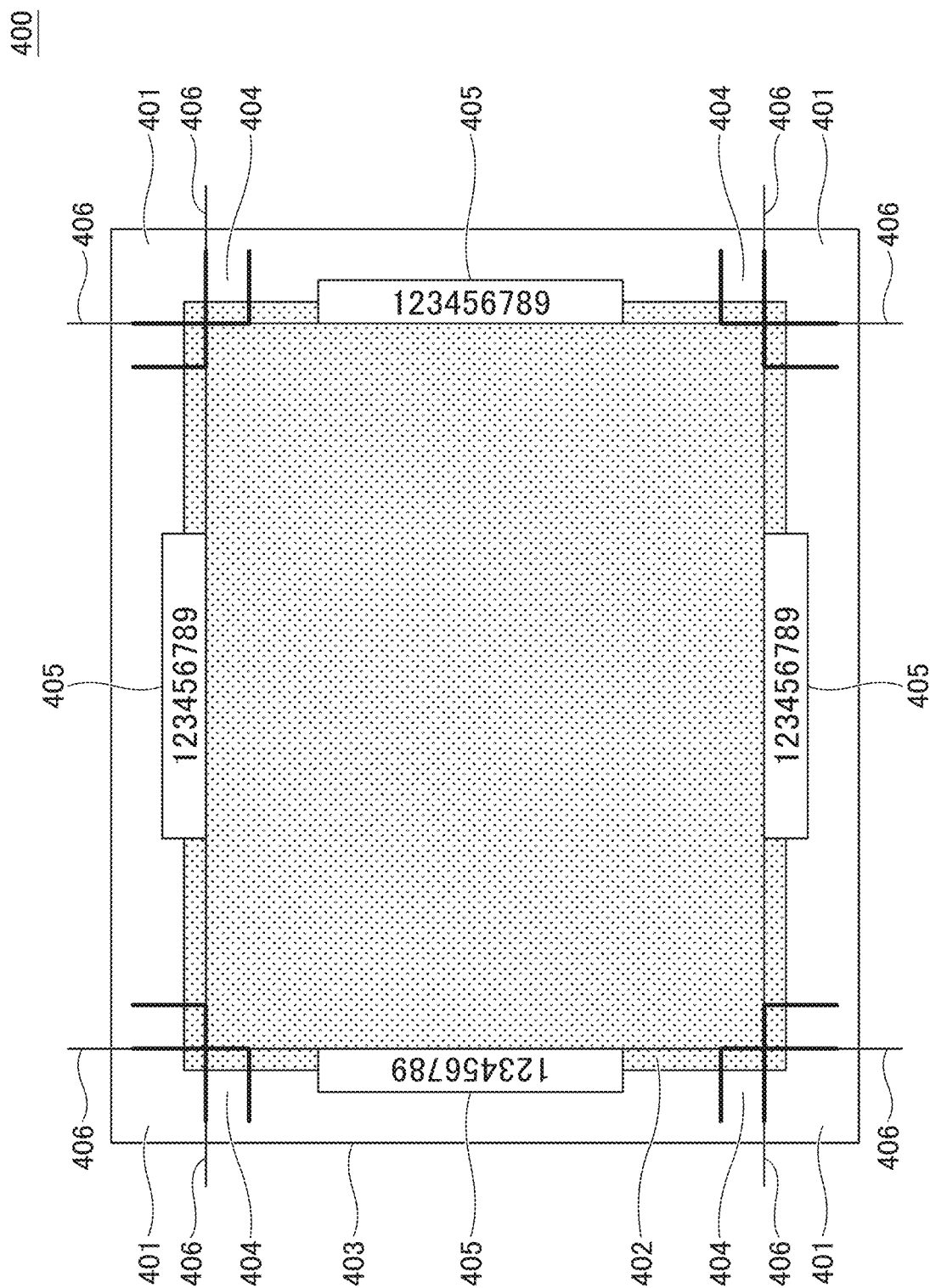
FIG. 6 is a diagram illustrating another example of the method of determining the print position of the identification number image, according to embodiments of the present disclosure.

FIG. 6 is a diagram another example of the method of determining the print position of the identification number image, according to embodiments of the present disclosure.

As illustrated in FIG. 6, in a case where the cut area is narrow, the identification number image may not fit in the cut area. In this case, a position closest to the non-cut area in the cut area and the margin area 401 is set as the print position of the identification number image. The above-described configuration can prevent the identification number image from being completely missing.

Figure 7:
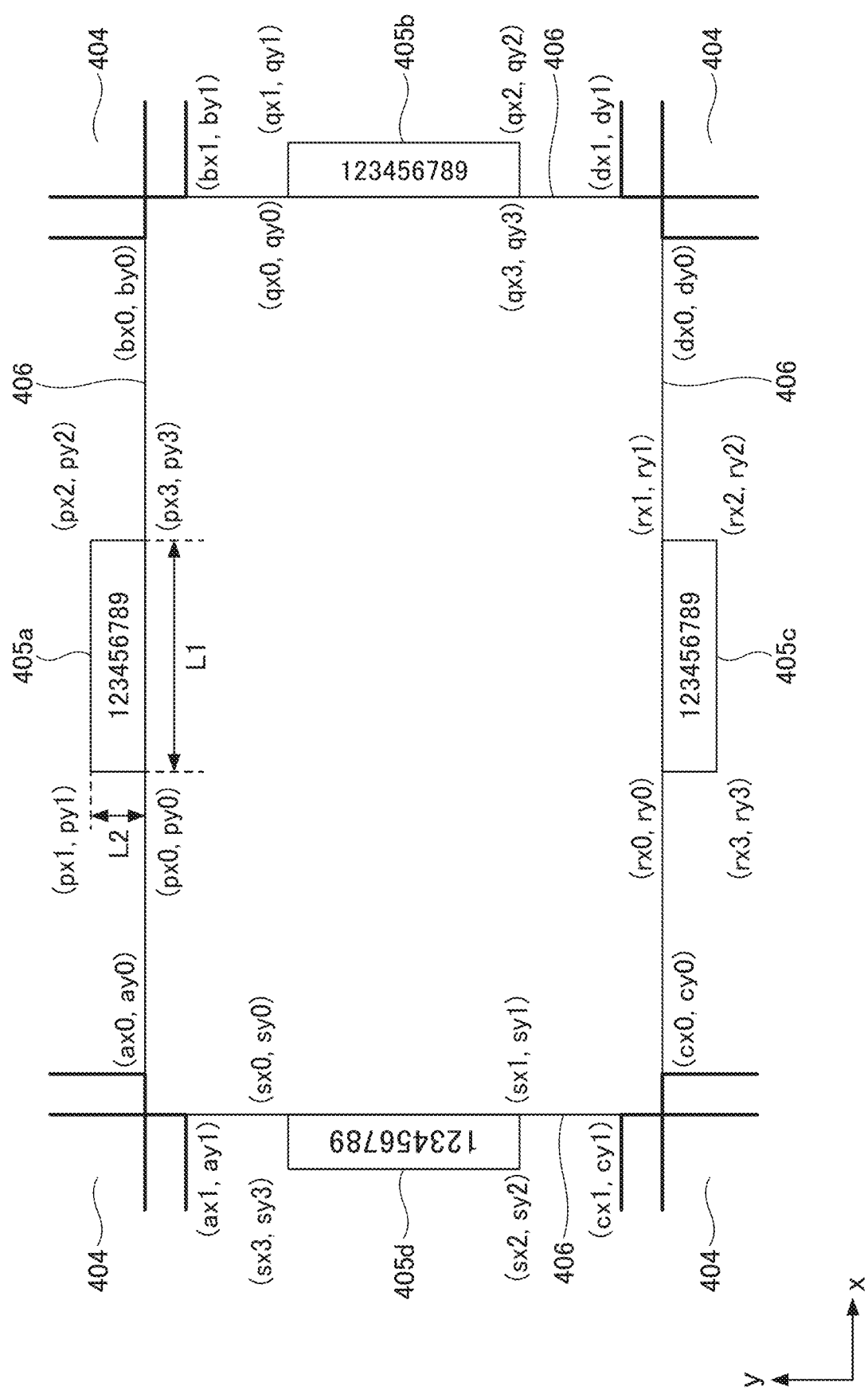
FIG. 7 is a diagram illustrating an example of calculation of the print position of the identification number image.

FIG. 7 is a diagram illustrating an example of calculation of the print position of the identification number image.

The coordinates of two L-shaped corner portions of an upper left cutting mark 404 are represented by (ax0, ay0) and (ax1, ay1), respectively. Similarly, the coordinates of an upper right cutting mark 404 are represented by (bx0, by0) and (bx1, by1), respectively. The coordinates of a lower left cutting mark 404 are represented by (cx0, cy0) and (cx1, cy1), respectively. The coordinates of a lower right cutting mark 404 are represented by (dx0, dy0) and (dx1, dy1), respectively.

The horizontal and vertical lengths of the identification number image are represented by L1 and L2, respectively. Note that L1 and L2 may be common to each identification number or may be individually set. Next, the coordinates of four corners of an identification number image 405a are represented by (px0, py0), (px1, py1), (px2, py2), and (px3, py3), respectively. Similarly, the coordinates of four corners of an identification number image 405b are represented by (qx0, qy0), (qx1, qy1), (qx2, qy2), (qx3, qy3), respectively. The coordinates of four corners of an identification number image 405c are represented by (rx0, ry0), (rx1, ry1), (rx2, ry2), (rx3, ry3), respectively. The coordinates of four corners of an identification number image 405d are represented by (sx0, sy0), (sx1, sy1), (sx2, sy2), (sx3, sy3), respectively.

The rasterized image processing unit 1012 calculates coordinates (px0, py0) in a case where the identification number image 405a is arranged at the center between the upper left and upper right cutting marks 404, for example, as in Equation 1 and Equation 2 described below.

$$px0 = (ax0 + bx0 + L1)/2 + \alpha px \; (\alpha px \text{ is a real number})$$ Equation 1

$$py0 = ay0 + \alpha py \; (\alpha py \text{ is a real number less than or equal to zero})$$ Equation 2

Similarly, the rasterized image processing unit 1012 calculates the coordinates (qx0, qy0), (rx0, ry0), and (sx0, sy0) of the identification number images 405b, 405c, and 405d, respectively, as in Equation 3 to Equation 8 described below.

$$qx0 = bx1 + \alpha qx \; (\alpha qx \text{ is a real number equal to or less than zero})$$ Equation 3

$$qy0 = (by1 + dy1 + L1)/2 + \alpha qy \; (\alpha qy \text{ is a real number})$$ Equation 4

$$rx0 = (cx0 + dx0 + L1)/2 + \alpha rx \; (\alpha rx \text{ is a real number})$$ Equation 5

$$ry0 = cy0 + \alpha ry \; (\alpha ry \text{ is a real number equal to or less than zero})$$ Equation 6

$$sx0 = ax1 + \alpha sx \; (\alpha sx \text{ is a real number equal to or less than zero})$$ Equation 7

$$sy0 = (ay1 + cy1 + L1)/2 + \alpha sy \; (\alpha sy \text{ is a real number})$$ Equation 8

Note that the equations from Equation 1 to Equation 8 are examples, and for example, Equation 1 may be set in a range from ax0 to (bx0−L1), may be set to a fixed value as appropriate, or an equation may be changed, and the same applies to the equations from Equation 3 to Equation 8. Alternatively, Equation 1 and Equation 5 or Equation 4 and Equation 8 may be common.

Figure 8:
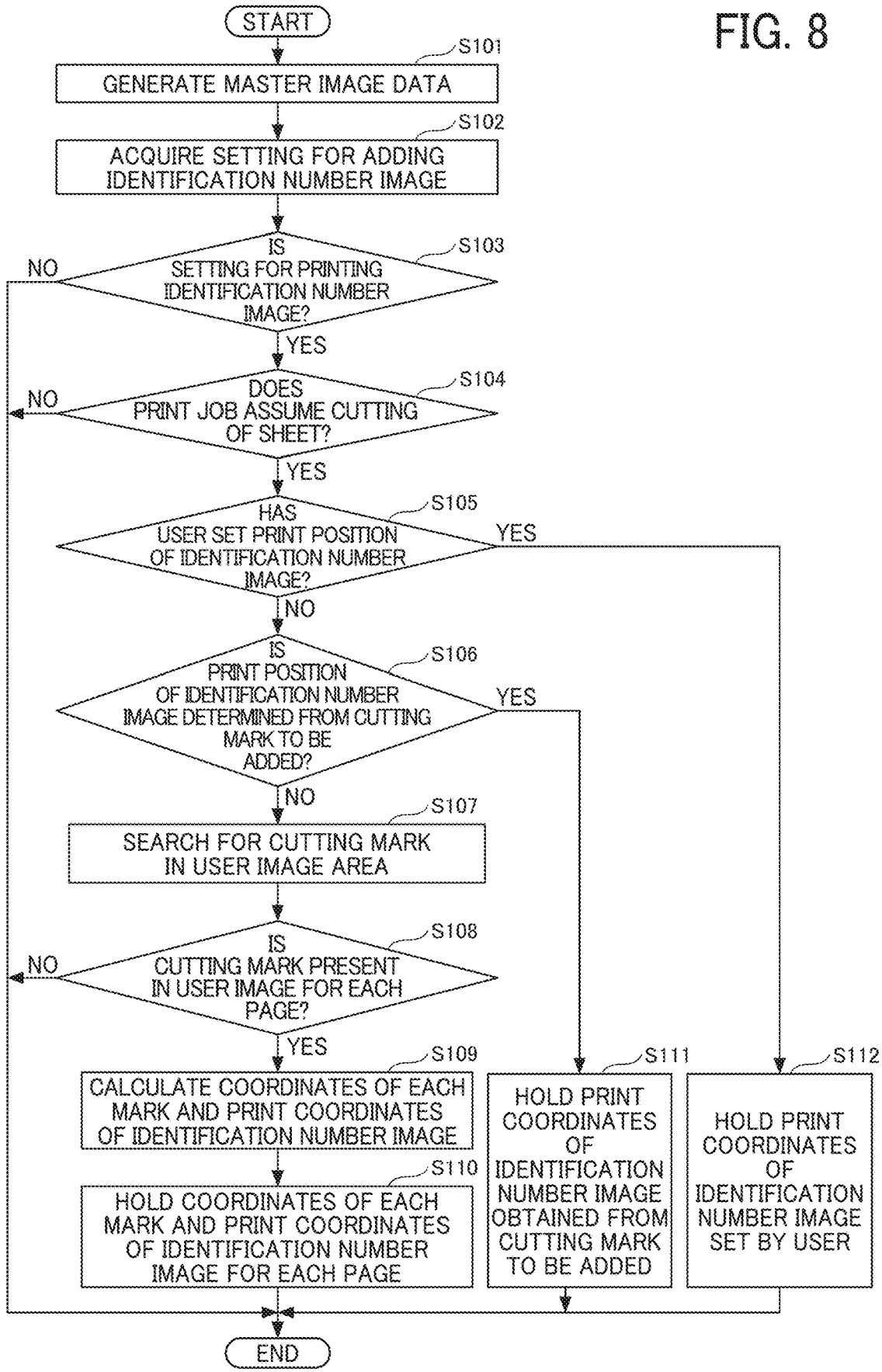
FIG. 8 is a flowchart of an example of a process of determining the print position of the identification number image.

A description is given of operations of the image forming system 1, with reference to FIG. 8. When the printer 10 acquires the print job data from the DFE 30 and performs printing of the print job data, the printer 10 executes a process of determining the print position of the identification number image.

FIG. 8 is a flowchart of an example of the process of determining the print position of the identification number image.

The following processing is executed for each page included in the print job data. The inspection device 20 generates master image data based on the rasterized image data (step S101). Next, the rasterized image processing unit 1012 acquires a setting value for adding an identification number image (step S102). The rasterized image processing unit 1012 determines whether the setting value indicates printing the identification number image (step S103). When the rasterized image processing unit 1012 determines that the setting value indicates printing the identification number image (YES in step S103), the rasterized image processing unit 1012 determines whether the print job assumes the cutting of the sheet (step S104).

When the rasterized image processing unit 1012 determines that the setting value does not indicate printing the identification number image (NO in step S103) or determines that the print job does not assume the cutting of the sheet (NO in step S104), the rasterized image processing unit 1012 ends the process of determining the print position of the identification number image.

When the rasterized image processing unit 1012 determines that the print job assumes the cutting of the sheet (YES in step S104), the rasterized image processing unit 1012 determines whether a user has designated the print position of the identification number image. When the rasterized image processing unit 1012 determines that the user has designated the print position of the identification number image (YES in step S105), the rasterized image processing unit 1012 holds print coordinates of the identification number image designated by the user (step S112).

When the rasterized image processing unit 1012 determines that the user has not designated the print position of the identification number image (NO in step S105), the rasterized image processing unit 1012 determines whether the print position of the identification number image is to be determined from the cutting marks to be added (step S106).

The printer 10 has, in advance, a setting of whether the cutting marks are assumed to be added to the user image in advance or the cutting marks are assumed to be added by the printer 10.

In the processing of step S106, in a case where the cutting marks are assumed to be added to the user image in advance, the rasterized image processing unit 1012 determines that the print position of the identification number image is not to be determined from the cutting marks to be added (NO in step S106).

Alternatively, in the processing of step S106, in a case where the cutting marks are assumed to be added by the printer 10, the rasterized image processing unit 1012 determines that the print position of the identification number image is to be determined from the cutting marks to be added (YES in step S106).

In a case where the rasterized image processing unit 1012 determines that the print position of the identification number image is to be determined from the cutting marks to be added (YES in step S106), the rasterized image processing unit 1012 holds the print coordinates of the identification number image obtained from the cutting marks to be added (step S111).

In a case where the rasterized image processing unit 1012 determines that the print position of the identification number image is not to be determined from the cutting marks to be added (NO in step S106), the rasterized image processing unit 1012 searches for the cutting marks in the user image area (step S107). A detailed description of a method of searching for the cutting marks is given below.

The rasterized image processing unit 1012 determines whether the cutting marks are included in the user image for each page (step S108). In a case where the rasterized image processing unit 1012 determines that the cutting marks are not included in the user image for each page (NO in step S108), the rasterized image processing unit 1012 ends the process of determining the print position of the identification number image.

In a case where the rasterized image processing unit 1012 determines that the cutting marks are included in the user image for each page (YES in step S108), the rasterized image processing unit 1012 calculates the coordinates of each cutting mark and the print coordinates of the identification number image (step S109). Then, the rasterized image processing unit 1012 holds the coordinates of each cutting mark and the print coordinates of the identification number image for each page (step S110).

The rasterized image processing unit 1012 generates a print image including the identification number image at the position of the print coordinates held in the processing of step S110.

Next, descriptions are given of the setting of a function to add the identification number image by the above-described rasterized image processing unit 1012. The function is referred to as an identification number image adding function.

Figure 9:
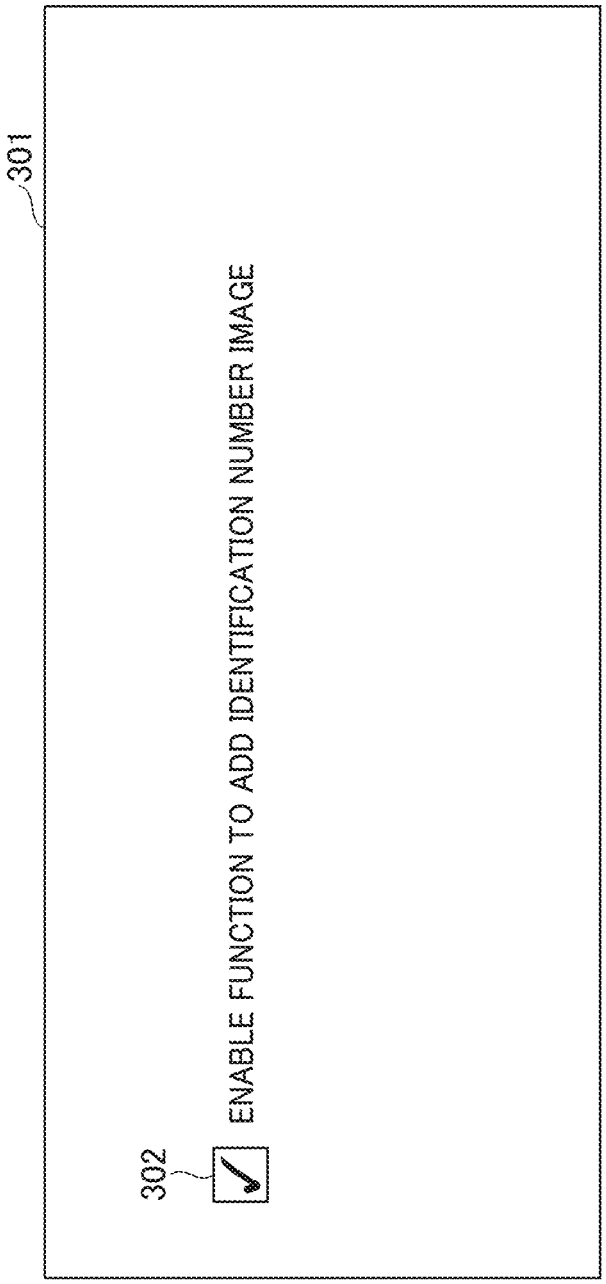
FIG. 9 is a diagram illustrating an example of a setting screen according to embodiments of the present disclosure.

FIG. 9 is a diagram illustrating an example of a setting screen according to embodiments of the present disclosure.

The setting screen 301 is a screen displayed on the operation panel 117 under the control of the display control unit 1002. The setting screen 301 includes a check box 302.

The check box 302 is a graphical user interface (GUI) for receiving a selection of whether to use the identification number image adding function.

The printer 10 stores the content selected on the setting screen 301 as a setting value in the storage unit 1005. For example, the storage unit 1005 stores information indicating that the setting value of the identification number image adding function is ON (valid) when the check box 302 is checked and information indicating that the setting value of the identification number image adding function is OFF (invalid) when the check box 302 is not checked.

Figure 10:
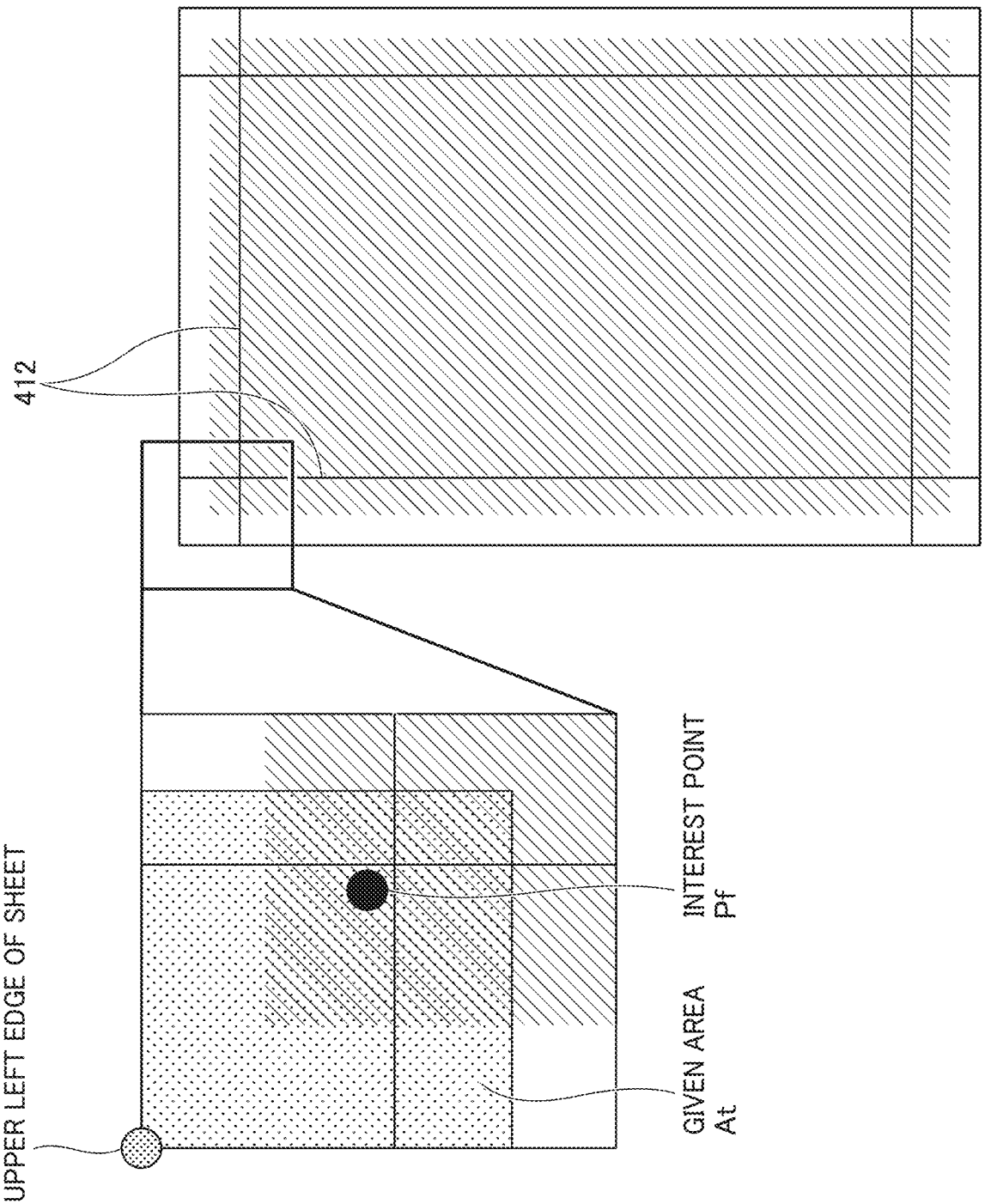
FIG. 10 is a diagram illustrating a method of searching for cutting marks, according to embodiments of the present disclosure.

FIG. 10 is a diagram illustrating the method of searching for the cutting marks, according to embodiments of the present disclosure.

In step S107 of the process of determining the print position of the identification number image in FIG. 8 described above, the rasterized image processing unit 1012 searches for the cutting marks in the user image area. Here, the rasterized image processing unit 1012 searches for the cutting marks in the master image generated in the processing of step S101. The cutting mark is, for example, a trim mark 412 illustrated in FIG. 10.

Specifically, for example, the rasterized image processing unit 1012 performs corner detection and detects a feature point (feature point Pf) in an area (given area At) having a constant length from the upper left edge of the sheet. A corner is an area where a large change in pixel value is observed in each direction. The rasterized image processing unit 1012 employs, for example, a Harris operator as a corner detection method (algorithm). Further, since the cutting mark is generally printed on the end of the sheet, the feature points closest to the upper left, lower left, upper right, and lower right edges of the sheet are selected from the feature points detected by the corner detection. Then, the rasterized image processing unit 1012 determines that the cutting marks are present in the step S108 of FIG. 8 when the feature points Pf are detected at the upper left, lower left, upper right, and lower right ends of the sheet.

Next, descriptions are given of the process for determining whether to display an identification number in a case where the printer 10 displays information about a defect detected by the inspection device 20.

Figure 11:
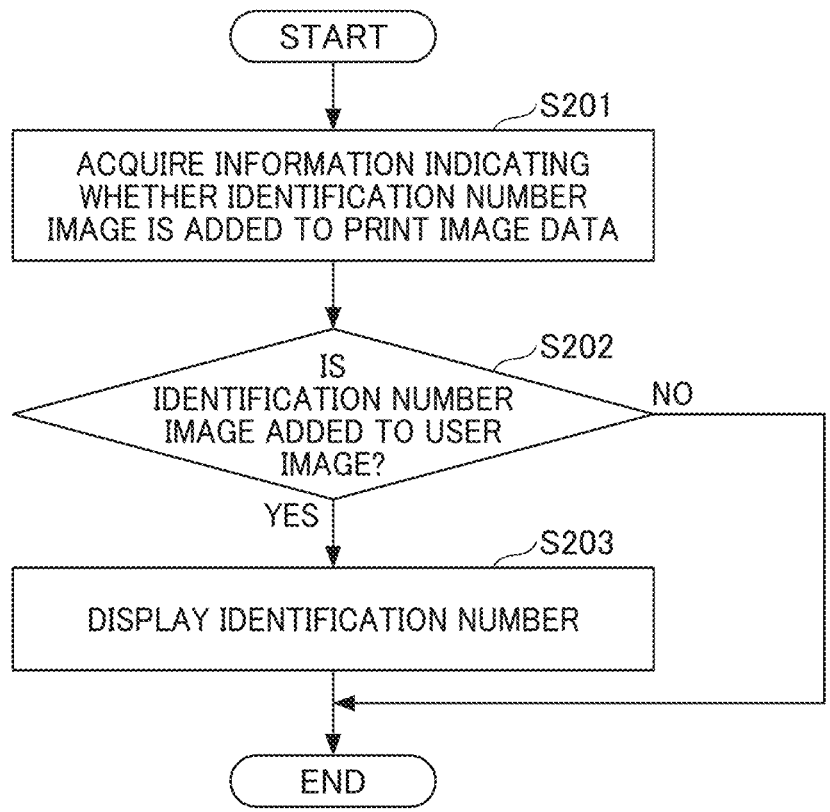
FIG. 11 is a flowchart of an example of a determination process of identification number display, according to embodiments of the present disclosure.

FIG. 11 is a flowchart of an example of a determination process of identification number display, according to embodiments of the present disclosure.

The job information processing unit 1011 acquires information indicating whether the identification number image is added to the print image data, in other words, information indicating the addition status of the identification number image (step S201). The information indicating the addition status of the identification number image is the information stored in, for example, the storage unit 1005 at step S110, S111, or S112 of the process of determining the print position of the identification number image illustrated in FIG. 8 described above.

The job information processing unit 1011 determines whether the identification number image has been added to the user image based on the information indicating the addition status of the identification number image (step S202). In a case where the job information processing unit 1011 determines that the identification number image has been added (YES in step S202), the job information processing unit 1011 displays the identification number (step S203).

Note that the printer 10 may transmit information indicating the addition status of the identification number image to the inspection device 20. In this case, the inspection device 20 may execute the determination process of identification number display illustrated in FIG. 11 when the inspection device 20 displays the information about the detected defect.

Figure 12:
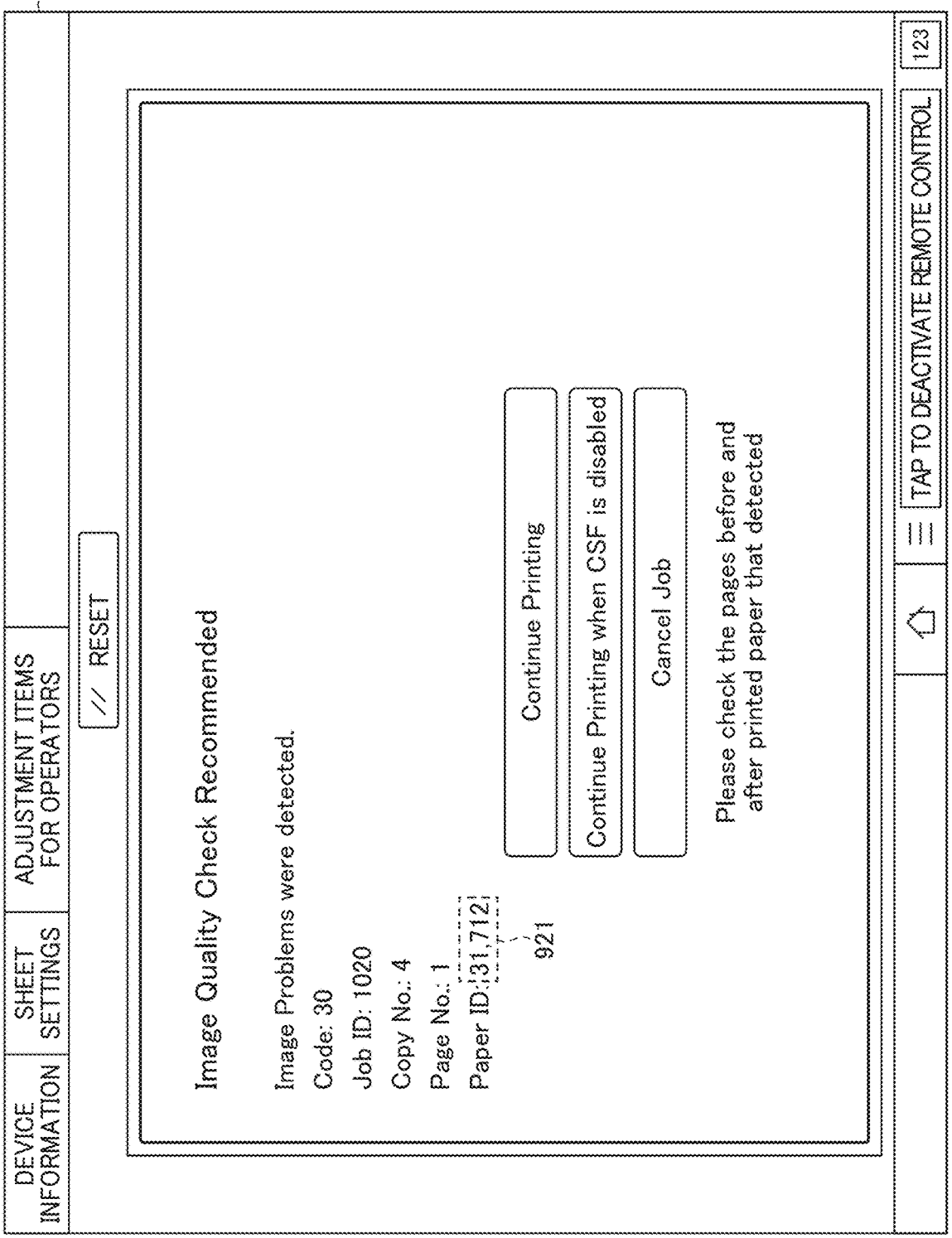
FIG. 12 is a diagram illustrating an example of an error screen according to embodiments of the present disclosure.

FIG. 12 is a diagram illustrating an example of an error screen according to embodiments of the present disclosure.

The inspection device 20 may instruct the printer 10 to stop printing in response to detection of a defect. In this case, the display control unit 1002 temporarily stops the print job in response to receipt of the instruction to stop the print job from the inspection device 20 and displays an error screen 920 illustrated in FIG. 12 on the operation panel 117. The error screen 920 includes buttons such as the "Continue Printing" button and the "Cancel Job" button, a job ID in which a defect is detected, the number of copies, the number of pages, and a display 921 of an identification number for identifying a page. In the display 921, a value is displayed in a case where the processing of step S110, S111, or S112 of the process of determining the print position of the identification number image in FIG. 8 is executed, and "-" is displayed in a case where the processing of step S110, S111, or S112 of the process of determining the print position of the identification number image illustrated in FIG. 8 is not executed. The code "-" indicates that the identification number is not assigned.

The image forming system 1 according to the present embodiment determines a position at which a second image including identification information to identify each page of a conveyance medium is printed, based on the position of a cutting mark, and generates print image data including the second image. Accordingly, the identification information can be printed more reliably on the conveyance medium.

The image forming system 1 may determine, in the first area, a position where the second image is printed. The position is, in an area where the first image is printed, a position at which the distance from a cutting line indicating a boundary with a second area, which is an area not to be cut, is smaller than a predetermined value. Accordingly, the image forming system 1 can prevent missing of the identification number image and print the identification information at a more reliable position in the cut area of the conveyance medium.

The image forming system 1 may determine a position in contact with the cutting line in the first area, as the position at which the second image is printed. Accordingly, the image forming system 1 can print the identification information at a most reliable position in the cut area of the conveyance medium.

The image forming system 1 may be configured to search for the cutting marks from the first image and determine the position at which the second image is printed based on the position of the searched cutting marks. Due to such a configuration, the image forming system 1 can contribute to eliminate the load of a user's operation of setting the print position of the identification number image.

The image forming system 1 may determine the position at which the second image is printed based on a predetermined position of the cutting mark. Due to such a configuration, even in a case where a cutting mark image is not included in the user image, the image forming system 1 can contribute to eliminate the load of the user's operation of setting the print position of the identification number image.

The image forming system 1 may determine the print position designated by the user, as the position at which the second image is printed. Such a configuration allows the user to designate the print position of the identification number image.

The image forming system 1 may determine any one or a plurality of positions in the first areas of the four sides of the conveyance medium, as the position at which the second image is printed. Such a configuration allows the user to easily recognize the identification number image.

The image forming system 1 may determine whether the second image is included in the print image data to be generated, based on a setting value indicating whether the second image is to be printed. Such a configuration allows the identification number image to be added to only the print job designated by the user, and can prevent the identification number image from being constantly attached to the printed material.

The image forming system 1 may determine whether the second image is included in the print image data to be generated, based on whether the job of printing the first image is a print job assuming the cutting of the sheet. Such a configuration allows the identification number image to be added to only the print job to be cut, and can prevent the identification number image from being constantly attached to the print material even if the user does not designate the identification number image each time.

The image forming system 1 determines whether the mark is present based on the horizontal or vertical position of each of the feature points detected at the four corners. Due to such a configuration described above, the feature of the corner mark or the trimming mark can be captured, and the mark can be more accurately detected.

Although the typical shape of a mark set by a user on a print image is fixed, the position of the mark may vary depending on the size of a sheet to be printed. As a result, the user designates an area corresponding to the position of the mark in the read image, so that the mark is detected more accurately.

In each of the above-described embodiments, the DFE 30, the inspection device 20, and the printer 10 may be configured to share the above-described processing steps in various combinations. Further, the elements of the DFE 30, the inspection device 20, and the printer 10 may be integrated into one apparatus or may be separately disposed in a plurality of different apparatuses.

In an embodiment, the DFE 30 or the inspection device 20 may be configured as an information processing system including a plurality of computing devices such as a server cluster. The plurality of computing devices are configured to communicate with one another via any type of communication link, including a network or shared memory to implement the processing described in the present specification.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention. Any one of the above-described operations may be performed in various other ways, for example, in an order different from the one described above.

The functionality of the elements disclosed herein may be implemented using circuitry or processing circuitry which includes general purpose processors, special purpose processors, integrated circuits, application specific integrated circuits (ASICs), digital signal processors (DSPs), field programmable gate arrays (FPGAs), conventional circuitry and/or combinations thereof which are configured or programmed to perform the disclosed functionality. Processors are considered processing circuitry or circuitry as they include transistors and other circuitry therein. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

What is claimed is:

1. An image forming system comprising:
processing circuitry configured to:
  generate print image data for printing a first image in a print area on a conveyance medium;
  control printing on the conveyance medium based on the print image data;
  determine, based on a position of a cutting mark, a position for printing a second image in a cut area the cut area being an area to be cut in the print area; and
  generate the print image data including the second image, the second image including identification information identifying each page of the conveyance medium.

2. The image forming system according to claim 1, wherein the processing circuitry is configured to determine the position for printing the second image as a position at which a distance from a cutting line indicating a boundary with a non-cut area not to be cut in the print area is below a threshold.

3. The image forming system according to claim 2, wherein the processing circuitry is configured to determine the position for printing the second image as a position in contact with the cutting line in the cut area.

4. The image forming system according to claim 1, wherein the processing circuitry is configured to determine the position of the cutting mark based on the first image.

5. The image forming system according to claim 4, wherein the processing circuitry is configured to determine the position of the cutting mark by
  detecting corners of the page,
  detecting a feature point in an area having a constant length from an upper left edge of the page, and
  determining that the cutting mark is present in response to detecting the feature point at an upper left end of the page, an upper right end of the page, a lower left end of the page, and an upper right end of the page.

6. The image forming system according to claim 5, wherein the processing circuitry is configured to detect the corners of the page in response to detecting a change in pixel values in each direction.

7. The image forming system according to claim 1, wherein the processing circuitry is configured to determine the position for printing second image based on a predetermined position of the cutting mark.

8. The image forming system according to claim 1, wherein the processing circuitry is configured to determine a designated print position, as the position for printing the second image.

9. The image forming system according to claim 1, wherein the processing circuitry is configured to determine at least one of a plurality of positions in cut areas of four sides of the conveyance medium, as the position for printing the second image.

10. The image forming system according to claim 1, wherein the processing circuitry is configured to determine whether the second image is included in the print image data to be generated, based on a setting value indicating whether the second image is to be printed.

11. The image forming system according to claim 1, wherein the processing circuitry is configured to determine whether the second image is included in the print image data to be generated, based on whether a job of printing the first image is a print job including cutting of the conveyance medium.

12. The image forming system according to claim 1, wherein the processing circuitry is configured to determine the position for printing the second image based on the position of the cutting mark in response to determining that a user has not designated the position for printing the second image.

13. A computer-executable method of printing identification information, the method comprising:
generating print image data for printing a first image in a print area on a conveyance medium;
controlling printing on the conveyance medium based on the print image data;
determining, based on a position of a cutting mark, a position for printing a second image in a cut area, the cut area being an area to be cut in the print area; and
generating the print image data including the second image, the second image including identification information identifying each page of the conveyance medium.

14. The method of claim 13, further comprising:
determining the position for printing the second image based on the position of the cutting mark in response to determining that a user has not designated the position for printing the second image.

15. The method of claim 13, further comprising:
determining the position of the cutting mark, based on the first image, by
detecting corners of the page,
detecting a feature point in an area having a constant length from an upper left edge of the page, and
determining that the cutting mark is present in response to detecting the feature point at an upper left end of the page, an upper right end of the page, a lower left end of the page, and an upper right end of the page.

16. The method of claim 15, wherein the detecting the corners of the page includes detecting the corners of the page in response to detecting a change in pixel values in each direction.

17. A non-transitory, computer-readable storage medium storing computer-readable program code that, when executed by or more processors, causes a computer to
generate print image data for printing a first image in a print area on a conveyance medium;
control printing on the conveyance medium based on the print image data;
determine, based on a position of a cutting mark, a position for printing a second image in a cut area, the cut area being an area to be cut in the print area; and
generate the print image data including the second image, the second image including identification information identifying each page of the conveyance medium.

18. The non-transitory, computer-readable storage medium of claim 17, wherein the computer-readable program code, when executed by the one or more processors, further causes the computer to:
determine the position for printing the second image based on the position of the cutting mark in response to determining that a user has not designated the position for printing the second image.

19. The non-transitory, computer-readable storage medium of claim 17, wherein the computer-readable program code, when executed by the one or more processors, further causes the computer to:
determine the position of the cutting mark, based on the first image, by
detecting corners of the page,
detecting a feature point in an area having a constant length from an upper left edge of the page, and
determining that the cutting mark is present in response to detecting the feature point at an upper left end of the page, an upper right end of the page, a lower left end of the page, and an upper right end of the page.

20. The non-transitory, computer-readable storage medium of claim 19, wherein the computer-readable program code, when executed by the one or more processors, further causes the computer to:
detect the corners of the page in response to detecting a change in pixel values in each direction.

* * * * *